Figure 1:
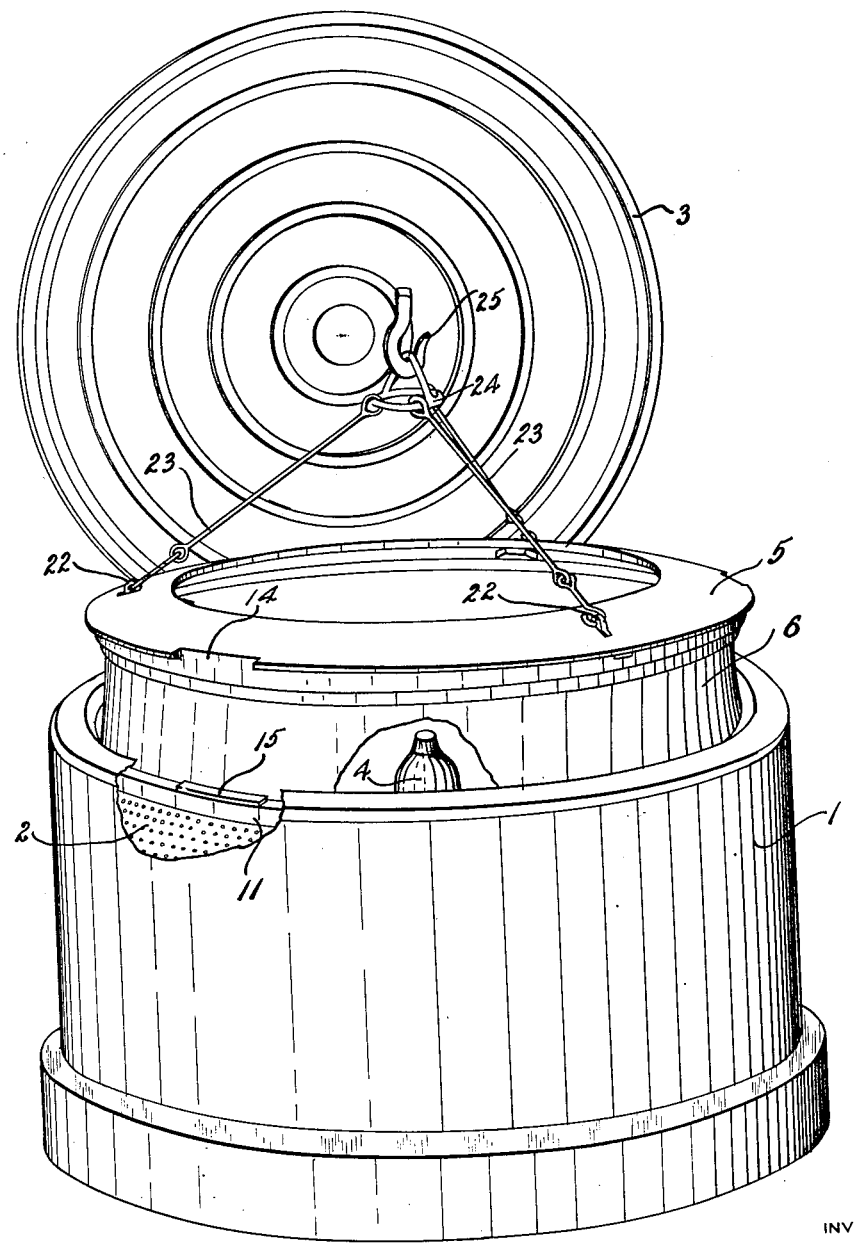

Aug. 7, 1934.                F. BALZER                1,969,494
                    UNLOADING NET FOR EXTRACTORS
                  Filed July 24, 1931        2 Sheets-Sheet 1

INVENTOR
FRED BALZER
BY
ATTORNEYS

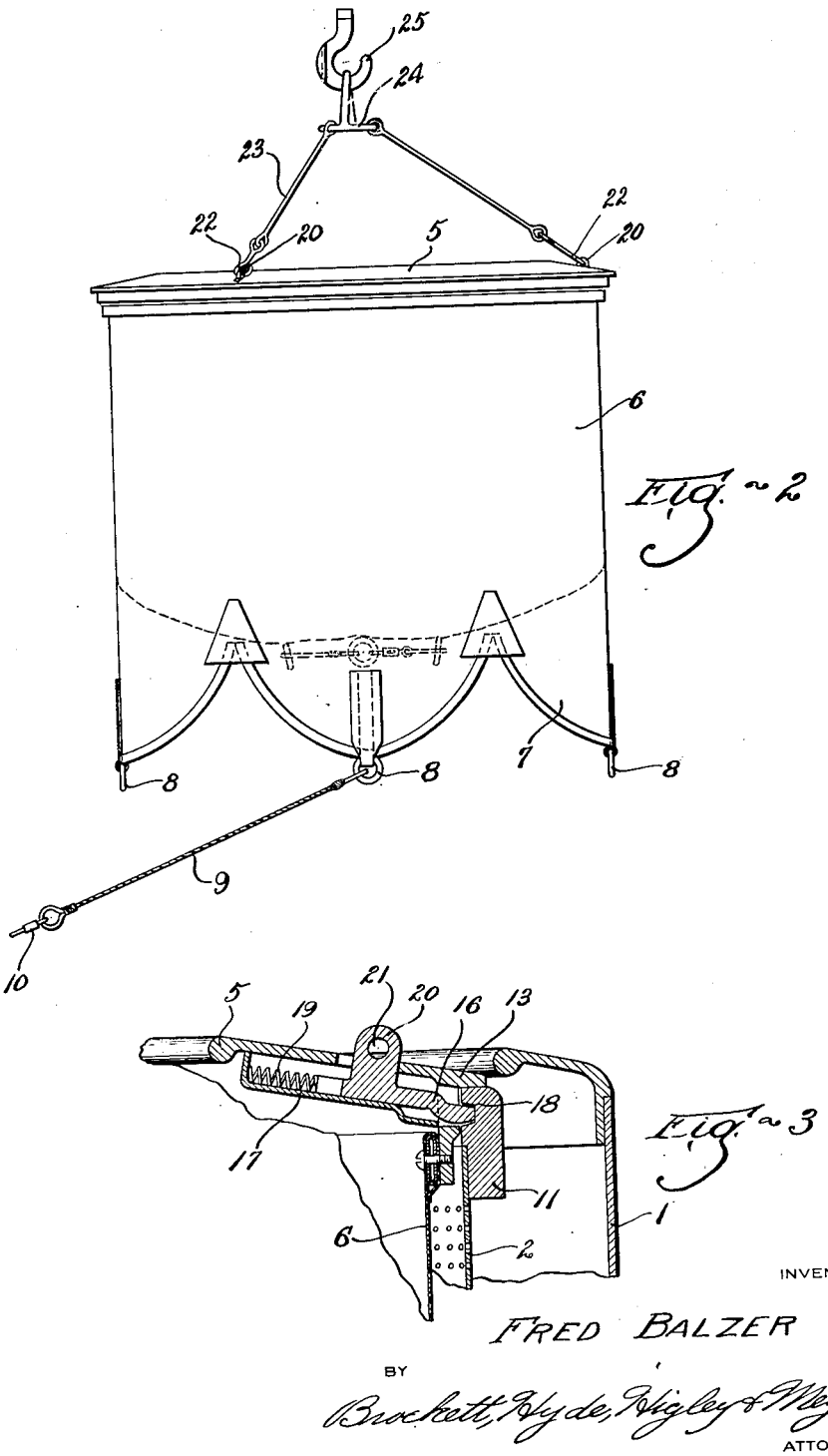

Patented Aug. 7, 1934

1,969,494

UNITED STATES PATENT OFFICE 1,969,494

UNLOADING NET FOR EXTRACTORS

Fred Balzer, Cincinnati, Ohio, assignor to The American Laundry Machinery Company, Cincinnati, Ohio, a corporation of Ohio Application July 24, 1931, Serial No. 552,897

2 Claims. (Cl. 210—76)

My invention relates to a loading and unloading net for extractors and, particularly, to a net adapted to receive the material to be disposed within the extractor and subjected to the extracting operation, the net also serving as a vehicle by which the work may be removed from the basket after the extracting operation.

One object of my invention is to provide an unloading net for extractors that is shaped to conform to the interior contour of an extractor basket and is so designed that it may be lowered into the basket and securely held therein or may be easily removed therefrom whereby the load of work may be placed in or removed from the extractor basket as a unit, the bottom of the net being so constructed that it may be released to dump the load, and being formed of segments that can give outwardly obviating the necessity of raising the basket to a great height for dumping.

Another object of my invention is to provide an unloading net for extractors of such nature that, when it is removed from the extractor basket after an extracting operation, the normal tendency of its walls to collapse will break up tightly packed work therein and insure easy removal of the work from the net. Such construction and operation prevents tearing of the pieces of work that have become entangled with other pieces as frequently occurs in removing the pieces individually from an extractor basket.

Still another object of my invention is to provide a means for preventing relative rotative movement of the net and basket when the net is disposed within the basket.

Various other objects and advantageous features of my invention will be seen in the following description and one embodiment thereof may be seen in the accompanying drawings wherein similar characters of reference designate corresponding parts, and wherein:

Fig. 1 is a perspective view of an extractor with its cover in open position and showing an unloading net constructed in accordance with my invention partiallly disposed within the basket thereof; Fig. 2 is an elevation showing an unloading net constructed in accordance with my invention; and Fig. 3 is a sectional view showing a latching means for retaining the unloading net within the extractor basket.

Referring to the drawings and particularly Fig. 1 thereof, I have shown an extractor that may be of any suitable type and embodies a curb 1 and a basket 2 disposed within and rotatable with relation to the curb, the curb being provided with a hinged cover 3 that is normally closed when an extracting operation is taking place by rotating the basket 2. The curb 1 may be suitably supported on a frame of a type to permit oscillatory and gyratory movement thereof and the curb shown embodies a center bearing within a center bearing cover 4 on which the basket 2 is mounted in the usual manner. Extractor construction is well known in the art and further description thereof is believed unnecessary.

In accordance with my invention, a container embodying an annular rigid top ring 5 and a flexible member, such as a net or bag 6 depending therefrom is provided for receiving work to be subjected to the extracting operation whereby the work may be placed in and removed from the extractor basket 2 as a unit. The net or bag 6 is somewhat greater in length than the depth of the extractor basket and its lower end is scalloped to form segmental portions 7 which, when their ends are drawn together, provide a bottom for the net or bag 6 with an opening in the center thereof through which the center bearing cover 4 projects when the net or bag is placed within the extractor basket. As shown, the lowermost end of each segmental portion 7 is provided with a link 8 through which a cord or draw string 9 may be threaded for drawing the outermost end of the segmental portions 7 toward the center of the net or bag to form a bottom therefor. The cord or draw string 9 is provided with suitable means such as the snap 10 for securing the free end of the cord or draw string after it has been woven through the rings 8. In the event that there is no center bearing cover on the type of extractor with which the net or bag 6 is employed, the bottom of the net or bag may be drawn completely closed.

The annular metallic top ring 5 from which the bag or net depends is of such diameter as to fit snugly within an upper ring 11 of the extractor basket 2 and is provided with an annular flange portion 13 adapted to rest on the ring 11 of the extractor basket to properly support the net or bag 6. As shown in Fig. 1, the flange 13 is provided with circumferentially spaced cutaway portions 14 adapted to fit over and cooperate with blocks 15 circumferentially spaced on the ring 11 to prevent relative rotation between the extractor basket 2 and the net or bag 6, when the net or bag is disposed within the extractor basket. Likewise, these cutaway portions and blocks serve to bring the net or bag 6 into the proper registering position with the extractor basket.

Suitable means are provided for securely locking the net or bag 6 in position in the basket 2 consisting of latches 16 disposed in circumferentially spaced latch housings 17 and normally spring pressed outwardly into cooperative relation with latch receiving grooves 18 in the extractor basket ring 11 by means of expanding springs 19. However, each latch bolt is provided with an upwardly extending ear 20 projecting through a slot in the annular ring 5 of the net or bag 6 and provided with an opening 21 adapted to receive hooks 22 of a net or bag lifting mechanism including rods 23 extending radially outwardly from a ring 24 which is adapted to be engaged by a hook 25 of any suitable raising and lowering power mechanism (not shown). With this construction, it will be seen that, when the net or bag is being raised or lowered, the weight of the net or bag or the net or bag plus the load therein will result in the latches 16 being drawn radially inwardly against the pressure of the springs 19 to withdraw the latches from their normal projected position. Thus, during raising or lowering of the net or bag the latches 16 are automatically moved to retracted position by the raising or lowering action and weight of the net or bag whereby the net or bag may be lowered into the extractor basket 2 with the latching means being projected into latching relation with the extractor basket as soon as the net or bag lifting mechanism is relieved of weight. Likewise, in removal of the net or bag, as soon as the lifting mechanism is subjected to the weight of the net or bag, the latches 16 will be withdrawn into the latch housings 17 which will permit the net or bag to be lifted out of the extractor basket 2.

In the use and operation of this net or bag, the segments 7 are first drawn together by threading the rope or draw string 9 through the rings 8 and securing the free end of the draw string or rope and the net or bag placed within the extractor basket 2 in the manner hereinbefore described. Of course, work may be placed within the net or bag prior to its disposal within the extractor basket 2 or after such operation. Then, the latching means and centering means hereinbefore described operate to latch the net or bag within the extractor basket 2 and prevent relative rotation between the net or bag and the extractor basket whereupon the lifting means may be disengaged, the cover closed, and the work subjected to the extracting operation by rotation of the basket 2. After the extracting operation, the cover is raised and the lifting mechanism attached to the net or bag 6 and power applied thereto which will withdraw the latches from latching engagement and raise the net or bag out of the extractor basket. Release of the rope or draw string 9 will result in the segmental bottom portion 7 of the net or bag spreading under force of the load within the basket and the load of work will gravitate therefrom.

Referring to the drawings and the preceding description, I have provided a loading and unloading net for an extractor so constructed that work may be easily dumped therefrom without necessitating the net or bag being lifted to any great height due to the segmental lower end of the net or bag which segments may be drawn together to form a net or bag bottom and are capable of outward movement under force of the work load. Various other features will be readily apparent.

What I claim is:

1. In combination with an extractor embodying a basket, a flexible container including a supporting ring adapted to fit within said extractor basket and having its lower end formed of segmental portions, means for drawing said segmental portions together to form a bottom for said container, and means including cooperating cutaway portions in the container supporting ring and blocks on the upper side of said extractor basket for preventing relative rotative movement between said container and basket.

2. In combination with an extractor embodying a basket, a flexible container including a supporting ring adapted to fit within said extractor basket and having its lower end formed of segmental portions, means for drawing said segmental portions together to form a bottom for said container, means including cooperating cutaway portions in the container supporting ring and blocks on the upper side of said extractor basket for preventing relative rotative movement between said container and basket, and means including a latch for preventing removal of said container from said basket.

FRED BALZER.